United States Patent [19]

Jøns et al.

[11] Patent Number: 4,495,162

[45] Date of Patent: Jan. 22, 1985

[54] PREPARATION OF A CALCIUM SULFATE ANHYDRITE MATERIAL OF LOW CHLORIDE CONTENT

[75] Inventors: Ebbe S. Jøns, Vaerløse; Klaus E. Gude, Vedbaek, both of Denmark

[73] Assignee: A/S Niro Atomizer, Søborg, Denmark

[21] Appl. No.: 413,417

[22] Filed: Aug. 31, 1982

[30] Foreign Application Priority Data

| Sep. 4, 1981 | [DK] | Denmark | 3912/81 |
| Sep. 8, 1981 | [DK] | Denmark | 3978/81 |
| Nov. 11, 1981 | [DK] | Denmark | 4992/81 |
| Mar. 16, 1982 | [DK] | Denmark | 1165/82 |
| May 28, 1982 | [DK] | Denmark | 2430/82 |

[51] Int. Cl.$^3$ .................... C04B 11/02; C04B 11/00; C01F 11/46

[52] U.S. Cl. .................... 423/171; 106/109; 106/110; 106/117; 423/172; 423/555

[58] Field of Search ............... 423/168, 170, 171, 172, 423/483, 485, 484, 486, 488, 555; 106/109, 110, 103

[56] References Cited

U.S. PATENT DOCUMENTS

| 2,948,948 | 8/1960 | Duplin, Jr. et al. | 106/DIG. 1 |
| 3,865,602 | 2/1975 | Stich et al. | 423/541 |
| 3,962,080 | 6/1976 | Dulin et al. | 106/DIG. 1 |
| 3,985,860 | 10/1976 | Mandelik et al. | 423/555 |
| 4,024,220 | 5/1977 | Ostroff et al. | 423/242 |
| 4,040,853 | 8/1977 | Binder et al. | 106/103 |
| 4,071,304 | 1/1978 | Chauvin et al. | 23/313 FB |
| 4,080,422 | 3/1978 | McCleary | 423/172 |
| 4,108,677 | 8/1978 | Valiga | 106/109 |
| 4,126,424 | 11/1978 | Kongsgaarden | 23/313 FB |
| 4,279,873 | 7/1981 | Felsuang et al. | 423/242 A |
| 4,299,634 | 11/1981 | Hutter et al. | 423/541 R |

FOREIGN PATENT DOCUMENTS

| 2732580 | 2/1978 | Fed. Rep. of Germany . | |
| 2659289 | 7/1978 | Fed. Rep. of Germany . | |
| 2803764 | 8/1979 | Fed. Rep. of Germany | 106/109 |
| 2826769 | 12/1979 | Fed. Rep. of Germany | 106/109 |
| 54-56096 | 5/1979 | Japan | 106/109 |
| 120519 | 11/1970 | Norway . | |
| 993115 | 5/1965 | United Kingdom . | |

OTHER PUBLICATIONS

Kirk-Othmer, Encyclopedia of Chemical Technology, Third edition, John Wiley & Sons, N.Y., N.Y., 1982, vol. 4, p. 439.

*Primary Examiner*—Gary P. Straub
*Attorney, Agent, or Firm*—Banner, Birch, McKie & Beckett

[57] ABSTRACT

A calcium sulfate anhydrite material is prepared from a spent absorbent resulting from desulfurization of flue gases. First the sulfite in the spent absorbent is oxidized into sulfate, preferably by heating in an oxygen containing gas, and thereafter the chloride content of the spent absorbent is reduced by heating the spent absorbent at a temperature of 600°–950°, preferably 750°–950° C. together with fly ash. Said fly ash may be recovered together with the spent absorbent in the desulfurization process, or it may have been recovered separately and mixed with the spent absorbent.

The product may be used as cement additive or for other purposes in which calcium sulfate anhydrite is conventionally utilized.

17 Claims, No Drawings

PREPARATION OF A CALCIUM SULFATE ANHYDRITE MATERIAL OF LOW CHLORIDE CONTENT

FIELD OF THE INVENTION

The present invention is directed to a process for preparing a calcium sulfate anhydrite material of low chloride content from a spent absorbent resulting from flue gas desulfurization by means of a basic calcium compound containing absorbent.

BACKGROUND OF THE INVENTION

Several processes for desulfurization of flue gas from combustion of fossil fuels utilize an absorbent based on a basic calcium compound such as hydrated lime, quick lime and lime stone.

Contact between the flue gas to be desulfurized and the absorbent may be provided as a gas-solid contact (dry process), as a scrubbing of gas by an aqueous suspension of the absorbent (wet process) or as a spray drying-absorption process (SDA-process) in which a suspension of the absorbent is spray dried in the gas, or by a combination of such contact methods. In the dry process and the SDA-process the spent absorbent is purged as a dry powder while the wet process delivers a sludge. In case the flue gas to be desulfurized contains fly ash the spent absorbent will have a substantial fly ash content. The calcium will mainly be present as sulfite and sulfate and, especially when the flue gas originates from the combustion of coal, a certain amount of calcium chloride will be present, typically between a half and a couple of weight percent $CaCl_2$. In case the absorbent has been used for treating flue gas originating from the incineration of waste materials comprising e.g. chlorine-containing plastics, the amount of calcium chloride in the spent absorbent may be substantially higher.

In connection with wet desulfurization processes it is conventional to transform the calcium sulfite into calcium sulfate by oxidation by means of air in aqueous medium and to reduce the chloride content of the resulting material by washing with water. However, disposal of the resulting chloride containing solution may be restricted by legislation. A method for reducing the chloride content of the spent absorbent from the wet desulfurization without creating a chloride solution, would therefore be needed.

It has turned out that also the sulfite in the spent absorbent resulting from the dry process or the SDA-process may be oxidized conveniently, viz by heating the spent absorbent in the presence of oxygen at a temperature of 350°–600° C.

The oxidized spent absorbent is suitable for use as a calcium sulfate anhydrite material in cement manufacture or for other purposes in which calcium sulfate anhydrite is conventionally applied, e.g. for Estricht cement, even when fly ash is present in substantial amounts. For said uses it is, however, essential that the chloride content is reduced to a low level.

It has turned out that chloride may be removed by heating the spent absorbent at a temperature between 150° and 600° C. in the presence of a material which with chloride forms salts susceptible to hydrothermal decomposition, resulting in formation of HCl, or evaporation. Said methods, however require addition of e.g. magnesium, iron or ammonium compounds which increases the costs and complicates the process and may involve formation of harmful residues.

SUMMARY OF THE INVENTION

We have now found that a high quality calcium sulfate anhydrite material of low chloride content may be produced from a spent absorbent, resulting from flue gas desulfurization by means of a basic calcium compound containing absorbent in which absorbent the calcium sulfite is initially oxidized into calcium sulfate, which process is characterized in:

(a) ensuring the presence of fly ash in intimate admixture with the spent absorbent, said fly ash resulting from the combustion of solid fuel, (b) heating the fly ash containing spent absorbent at a temperature of 600°–950° C., preferably 750°–950° C., (c) contactiing the fly ash containing spent absorbent with water vapor during said heating, and (d) removing HCl-gas driven off by said heating.

A sufficient amount of fly ash will often be present in the spent absorbent as recovered from a spray-dryer-absorber, a particle separator or wet scrubber. However, in case fly ash is removed from the flue gas before desulfurization thereof, said fly ash or a portion thereof or fly ash from another source are mixed with the spent absorbent before heating.

It has been experienced that heating of a spent desulfurization absorbent having no fly ash content does not result in any substantial reduction of chloride content at temperatures below 950° C.

It is believed that the silicious components of the fly ash in the process react with calcium chloride (and with basic components such as non-reacted calcium oxide and hydroxide) whereby hydrogen chloride is liberated.

Because fly ash is generally regarded as a material of basic character which in aqueous suspensions has a certain ability of neutralizing acids, it has not been obvious to use said material as a base neutralizing and hydrogen chloride expelling agent in the process according to the invention. However, it has turned out that even fly ash of the type which is usually termed "alkaline" has the ability of neutralizing basic calcium compounds and to expel hydrogen chloride from calcium chloride at the temperatures in question, because the silicious component of the fly ash, which is substantially inactive in aqueous medium at ambient temperature, becomes reactive at the higher temperatures, where calcium chloride is present as a melt.

The most importent reaction for the removal of chloride is the following:

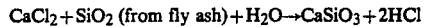

$$CaCl_2 + SiO_2 \text{ (from fly ash)} + H_2O \rightarrow CaSiO_3 + 2HCl$$

However, also other reactions which may result in Portland cement precursors may take place. During such reactions e.g. the following compounds may be formed: dicalcium silicate, tetracalcium alumino ferrite and calcium aluminate.

As it appears from the above reaction $H_2O$ is essential for the formation of the volatile HCl. However, experiments have proven that sufficient $H_2O$ will always be present when the heating is performed by contacting the spent absorbent directly with hot combustion gas. Said hot combustion gas may also serve for removing the HCl gas. Usually said HCl may be released to the atmosphere mixed with the desulfurized flue gas without exceeding the limits for HCl emission.

Generally the ratio between components of potential acid character such as $SiO_2$ in the fly ash and basic calcium compounds and calcium chloride is not critical, and even smaller amounts of $SiO_2$ than what would satisfy the above reaction may give a sufficient HCl removal, but with relative small amount of $SiO_2$ or corresponding components, the heating should be at higher temperatures or of longer duration. In a preferred embodiment the amount of fly ash is at least sufficient for providing silicious and aluminous compounds in a quantity corresponding to the stoichiometric amount required for binding as $Ca_2SiO_4$ and $Ca_2Al_2O_5$, all Ca not present as $CaSO_4$. Thereby an efficient chloride removal is obtained by heating for less than 30 minutes to a temperature less than 900° C.

Although it is preferred that all silicious compounds and any other compounds of potential acidic character necessary for reaction with basic calcium compounds and calcium chloride to enable hydrogen chloride to be driven off, are provided as components of the fly ash, it is within the scope of the invention to compensate for any deficiency of such compounds provided by the fly ash, by adding one or more further compounds having CaO neutralizing ability at the temperature at which heating is performed. A preferred example of such further compound is silica sand.

The HCl-removal may moreover be promoted by the presence of a compound which with chloride forms a salt susceptible to hydrothermal decomposition, resulting in formation of HCl, or evaporation when heated in step (b), Examples of such compounds are magnesium, ferrous, ferric and ammonium compounds.

As explained above any sulfite in the spent absorbent should be oxidized to sulfate before HCl is driven off. Said oxidation is most conveniently performed by heating in air, and it is terminated before the spent absorbent reaches the temperature, at which chloride removal takes place. The oxidation is exothermic and therefore contributes to the achievement of the temperature necessary for the chloride expelling reactions.

The oxidation as well as the heating in step (b) may suitably be performed in a rotary kiln of known design.

Alternatively the oxidation as well as the chloride removal may take place while the fly ash containing spent absorbent is suspended in hot gases.

In an embodiment of the process which is operationally advantageous the fly ash containing spent absorbent is first heated while suspended in hot oxygen containing gas to accomplish the oxidation, whereupon the thus preheated spent absorbent is introduced into a rotary kiln in which the final HCl-expelling heating at 750°-900° C. takes place.

Where the present specification and the attached claims indicate that a heating is performed by suspending the spent absorbent in a gas, this encompass the use of fluidized beds as well as flash heating devices with connected particle collecting means.

The process makes possible a substantially complete removal of chloride. The efficiency of the process depends on the intensity and duration of the heat treatment in step (b) as well as on the composition of the mixture of fly ash and spent absorbent as explained above. Since a minor chloride content may be acceptable for most applications of materials of the type in question the process will for economical reasons be conducted only to provide a reduction of the chloride contents below the maximum limit for the purpose contemplated.

Besides reduction of the chloride content the heating in step (b) may involve a further improvement of the fly ash containing absorbent as far as the suitability for use as cement additive is concerned. This is due to the fact that certain maximum limits exist as to the content of components insoluble in hydrochloric acid of the final cement. Consequently a high proportion of components insoluble in hydrochloric acid may limit the amount of a cement additive allowable in a certain cement composition. By heating in step (b) of the fly ash admixed with spent absorbent a substantial increase of the solubility of the fly ash in hydrochloric acid is obtained.

Also for applications other than as cement additive the material prepared by the process according to the invention has superior qualities. Due to the heat treatment the calcium sulfate is in a condition in which the setting rate is sufficiently low for permitting a high strength product to be obtained when moulded articles are produced.

The invention also comprises a plant suitable for carrying out the process, which plant has means for suspending a mixture of fly ash and sulfite and chloride containing spent absorbent into a stream of hot oxygen containing gas, means for collecting said mixture after oxidation of the sulfite therein, and a rotary kiln for heating the collected mixture at a temperature of 600°-950° C., preferably 750°-950° C.

This plant is especially advantageous because suspending of the mixture in oxygen containing gas during the preliminary heating secures that oxygen is available for the oxidation, which means that substantial all sulfite is converted to sulfate, and release of $SO_2$ is avoided. On the other hand it is perferred to perform the succeeding chloride expelling heating in a rotary kiln because contact between the particles of the mixture is better in a rotary kiln than if the mixture were suspended in a hot gas, and it has turned out that also in a rotary kiln the supply of $H_2O$-vapour will be sufficient for the hydrolysis, even when no special measures are taken to provide $H_2O$.

The invention is further elucidated by means of the following examples.

EXAMPLE 1

A spent absorbent obtained by desulfurization of flue gas from coal combustion by the SDA-process was used in this example. 31% by weight consisted of fly ash having the following analysis:

| | | |
|---|---|---|
| $SiO_2$ | 47.0% | by weight |
| $Al_2O_3$ | 27.0% | by weight |
| $Fe_2O_3$ | 7.8% | by weight |
| CaO | 5.0% | by weight |
| MgO | 1.9% | by weight |
| $TiO_2$ | 1.1% | by weight |
| $Na_2O$ | 0.8% | by weight |
| $K_2O$ | 3.2% | by weight |
| $SO_3O$ | 0.7% | by weight |
| $P_2O_5$ | 0.8% | by weight |

LOI (loss of ignition) 815° C.: 8.9% by weight while the composition of the remaining absorbent material corresponded to the following (calculated on the fly ash containing mixture):

| | |
|---|---|
| $CaSO_3.\frac{1}{2}H_2O$ | 35% |
| $CaSO_4.2H_2O$ | 26% |
| $Ca(OH)_2 + CaCO_3$ | 3% |

| -continued | |
|---|---|
| CaCl$_2$.2H$_2$O | 2% |

Samples of said material were placed in an electric laboratory kiln in which an ample amount of air was available for contact with the absorbent.

The kiln was heated to reach a temperature of 1000° C. within 30 minutes.

Samples were withdrawn at temperatures of 20, 400, 600, 800 and 1000° C., resp. and analysed for SO$_3{}^{2-}$ and Cl$^-$. The results are calculated below:

|  | SO$_3{}^{2-}$ % w/w | Cl$^-$ % w/w |
|---|---|---|
| 20° C. | 21.5 | 0.90 |
| 400° C. | 15.3 | 0.90 |
| 600° C. | 0.1 | 0.86 |
| 800° C. | 0.0 | 0.18 |
| 1000° C. | 0.0 | 0.02 |

It appears that the oxidation of sulfite into sulfate takes place at temperatures below 600° C. The chloride hydrolyzis takes place at higher temperatures. A substantial Cl reduction has been achieved at 800° C.

EXAMPLE 2

In this example the results of heating a fly ash containing spent absorbent by the process according to the invention was compared with the result obtained when the spent absorbent was heated without fly ash being present.

The ash-free spent absorbent had the following characteristics:

| Alkalinity meq OH/g (by titration to pH 6) | 3.1 |
|---|---|
| Insoluble in Hydrochloric acid, % | 0.6 |
| % SO$_3{}^{2-}$ | 43.2 |
| Total S as % SO$_4{}^-$ | 53.5 |
| % Cl$^-$ | 2.8 |
| % Ca$^{2+}$ | 31.5 |

To a portion of said spent absorbent was added 20% by weight fly ash, calculated on the mixture of spent absorbent and fly ash. The fly ash showed the following analysis:

| SiO$_2$ | 51% by weight |
|---|---|
| Al$_2$O$_3$ | 28% by weight |
| Fe$_2$O$_3$ | 12% by weight |
| CaO | 1.9% by weight |
| MgO | 2.4% by weight |
| TiO$_2$ | 1.4% by weight |
| Na$_2$O | 0.4% by weight |
| K$_2$O | 3.1% by weight |
| SO$_3$ | 0.25% by weight |
| P$_2$O$_5$ | 0.34% by weight |

| -continued | |
|---|---|
| LOI 815° C.: | 2.2% by weight |

The samples were tested not only for SO$_3{}^{2-}$ and Cl$^-$, but also for alkalinity by titration to pH 6.0 and for components insoluble in concentrated hydrochloric acid (DIN 1164 Teil 3). The results were as follows:

|  | Spent absorbent with fly ash | | | | Spent absorbent without fly ash | | |
|---|---|---|---|---|---|---|---|
|  | 400° C. | 600° C. | 800° C. | 1000° C. | 400° C. | 600° C. | 800° C. |
| Alkalinity meq/g pH 6.0 | 1.76 | 1.05 | 0.73 | 0.37 | 3.11 | 2.44 | 3.12 |
| insoluble in hydrochloric acid % | 18.1 | 16.6 | 13.2 | — | 0.6 | 0.3 | 0.3 |
| SO$_3{}^{2-}$ % | 32.0 | 0.2 | 0.0 | 0.2 | 36.3 | 0.1 | 0.0 |
| Cl$^-$ % | 2.8 | 2.7 | 1.6 | 0.7 | 2.9 | 2.8 | 2.7 |

These results clearly prove that only when fly ash is present a substantial chloride removal is obtained by the heating. It moreover appears that the solubility of the fly ash in hydrochloric acid is improved by the process according to the invention.

EXAMPLES 3-7

In this examples the heating was performed in a fluidized bed using the following maximum temperatures: 680, 740, 760, 850 og 980° C., resp. The fly ash containing spent absorbent to be treated was as defined in Example 1.

The results were as follows:

|  | Examples | | | | |
|---|---|---|---|---|---|
|  | 3 | 4 | 5 | 6 | 7 |
| Max. temperature °C. | 680 | 740 | 760 | 850 | 980 |
| Residence time at a temp. above 500° C. min. | 27 | 11 | 14 | 10 | 22 |
| SO$_3{}^{2-}$ % | 0.0 | 0.0 | 0.0 | 0.0 | 0.0 |
| Cl$^-$ % | 0.46 | 0.65 | 0.48 | 0.44 | 0.32 |

As it appears a substantial reduction of the chloride content may be obtained also at relatively low temperatures when the residence time is increased.

We claim:

1. A process for preparing a calcium sulfate anhydrite material of low chloride content from a chloride containing spent absorbent resulting from flue gas desulfurization by means of a basic calcium compound containing absorbent, said spent absorbent containing an amount of chloride equivalent to at least about 0.5 weight percent calcium chloride comprising the steps of
    (a) oxidizing calcium sulfite in said spent absorbent into calcium sulfate,
    (b) ensuring the presence of sufficient fly ash in intimate admixture with the spent absorbent for substantially reducing the chloride content of the spent absorbent, said fly ash resulting from the combustion of solid fuel,
    (c) heating the fly ash containing oxidized spent absorbent at a temperature of 600°-950° C.,
    (d) contacting the fly ash containing oxidized spent absorbent with water vapor during said heating, and
    (e) removing HCl-gas driven off by said heating.

2. A process according to claim 1, wherein the presence of fly ash in the spent absorbent is ensured by recovering the fly ash together with the spent absorbent in the desulfurization process.

3. A process according to any of the claims 1-2, wherein the heating in step (b) is performed in a rotary kiln.

4. A process according to claim 3, wherein the heating in the rotary kiln is preceeded by oxidation by suspensing the fly ash containing spent absorbent in hot oxygen-containing gas.

5. A process according to claim 1 wherein the fly ash containing spent absorbent is heated at a temperature of 750°–950° C.

6. A process according to claim 2 wherein the fly ash containing spent absorbent is heated at a temperature of 750°–950° C.

7. A process according to claim 1, wherein the chloride containing spent absorbent results from spray drying a suspension of said basic calcium compound containing absorbent in the flue gas.

8. A process according to claim 1 or 2, wherein the amount of fly ash is at least sufficient for providing silicious and aluminous compounds in a quantity corresponding to the stoichiometric amount required for binding as $Ca_2SiO_4$ and $Ca_2Al_2O_5$, all Ca in the mixture not present as $CaSO_4$.

9. A process according to any of the claims 1-2, wherein silica sand is added before the heating in step (b).

10. A process according to any of the claims 1-2, wherein a compound is incorporated before step (b) which compound with chloride forms a salt susceptible to hydrothermal decomposition, resulting in formation of HCl, or evaporation when heated in step (b), said compound selected from the group consisting of magnesium, ferrous, ferric and ammonium compounds and mixtures thereof.

11. A process according to any of the claims 1-2, wherein the heating in step (b) is performed by suspending the fly ash containing spent absorbent in a hot gas.

12. A process for preparing a calcium sulfate anhydrite material of low chloride content from a chloride containing spent absorbent resulting from desulfurization of fly ash containing flue gas by means of a basic calcium compound containing absorbent, said spent absorbent containing an amount of chloride equivalent to at least about 0.5 weight percent calcium chloride, comprising the steps of
(a) recovering a mixture of said spent absorbent and sufficient fly ash for substantially reducing the chloride content of the spent absorbent from the desulfurized flue gas;
(b) oxidizing calcium sulfite in said mixture into calcium sulfate;
(c) driving off HCl-gas by heating the mixture at 600°–950° C. in the access of water vapor; and
(d) removing the HCl-gas driven off by said heating.

13. A process according to claim 12 wherein the fly ash containing spent absorbent is heated at a temperature of 750°–950° C.

14. A process for preparing a calcium sulfate anhydrite material of low chloride content from a chloride containing spent absorbent resulting from flue gas desulfurization by means of a basic calcium compound containing absorbent, said spent absorbent containing an amount of chloride equivalent to at least about 0.5 weight percent calcium chloride, comprising the steps of
(a) mixing said spent absorbent with sufficient fly ash for substantially reducing the chloride content of the spent absorbent, said fly ash resulting from the combustion of solid fuel;
(b) oxidizing calcium sulfite in the mixture prepared in step (a) into calcium sulfate;
(c) driving off HCl-gas by heating the mixture at 600°–950° C. in the access of water vapor; and
(d) removing the HCl-gas driven off by said heating.

15. A process for preparing a calcium sulfate anhydrite material of low chloride content from a chloride containing spent absorbent resulting from flue gas desulfurization by means of a basic calcium compound containing absorbent, said spent absorbent containing an amount of chloride equivalent to at least about 0.5 weight percent calcium chloride comprising the steps of
(a) oxidizing calcium sulfite in said spent absorbent into calcium sulfate;
(b) preparing a mixture of the spent absorbent in which the sulfite has been oxidizing, with sufficient fly ash for substantially reducing the chloride content of the spent absorbent, said fly ash resulting from the combustion of solid fuel;
(c) driving off HCl-gas by heating the mixture at 600°–950° in the access of water vapor; and
(d) removing the HCl-gas driven off by said heating.

16. A process according to claim 14 wherein the fly ash containing spent absorbent is heated at a temperature of 750°–950° C.

17. A process according to claim 15 wherein the fly ash containing spent absorbent is heated at a temperature of 750°–950° C.

* * * * *